US011472362B2

(12) United States Patent
Radetzki et al.

(10) Patent No.: US 11,472,362 B2
(45) Date of Patent: Oct. 18, 2022

(54) TRIGGERING AT LEAST ONE CRASH CUSHION OF AN UNMANNED VEHICLE

(71) Applicants: Uwe Radetzki, Bonn (DE); Dong-Uck Kong, Bonn (DE); Boris Trendafilov, Sankt Augustin (DE); Heike Bischoff, Cologne (DE); Sandra Drees, Königswinter (DE)

(72) Inventors: Uwe Radetzki, Bonn (DE); Dong-Uck Kong, Bonn (DE); Boris Trendafilov, Sankt Augustin (DE); Heike Bischoff, Cologne (DE); Sandra Drees, Königswinter (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 16/929,888

(22) Filed: Jul. 15, 2020

(65) Prior Publication Data
US 2021/0016735 A1  Jan. 21, 2021

(30) Foreign Application Priority Data
Jul. 15, 2019 (DE) ..................... 10 2019 119 093.2

(51) Int. Cl.
B60R 21/0134 (2006.01)
B60R 21/36 (2011.01)
B60R 21/01 (2006.01)

(52) U.S. Cl.
CPC .......... B60R 21/0134 (2013.01); B60R 21/36 (2013.01); B60R 2021/01013 (2013.01);
(Continued)

(58) Field of Classification Search
CPC ............... B60R 21/0134; B60R 21/36; B60R 2021/01013; B60R 2021/01211;
(Continued)

(56) References Cited

U.S. PATENT DOCUMENTS 5,732,785 A * 3/1998 Ran ...................... B60R 19/205
180/271
9,804,599 B2 * 10/2017 Kentley-Klay ........ G08G 1/202
(Continued)

FOREIGN PATENT DOCUMENTS

CN 102811889 A 12/2012
CN 103863233 A 6/2014
(Continued)

Primary Examiner — Darlene P Condra
(74) Attorney, Agent, or Firm — Reinhart Boerner Van Deuren P.C.

(57) ABSTRACT

A method is disclosed in which sensor information is obtained that is captured by at least one environment sensor of an unmanned vehicle. The sensor information represents at least one object parameter of an object that is moving relative to the unmanned vehicle. At least partly based on the at least one object parameter, it is determined whether a collision between the unmanned vehicle and the object is imminent. If it is determined that a collision between the unmanned vehicle and the object is imminent, at least partly based on the at least one object parameter, at least one triggering parameter is determined for triggering at least one crash cushion of the unmanned vehicle. The at least one crash cushion is triggered according to the at least one triggering parameter. The at least one crash cushion is triggered before the imminent collision.

21 Claims, 5 Drawing Sheets

(52) U.S. Cl.
CPC ............ *B60R 2021/01211* (2013.01); *B60R 2021/01286* (2013.01)

(58) Field of Classification Search
CPC .......... B60R 2021/01286; B60R 2021/01231; B60R 2021/01225; B60R 2021/01218; B60R 2021/01345; G08G 1/166; G08G 1/163
See application file for complete search history.

(56) References Cited

U.S. PATENT DOCUMENTS

| | | | |
|---|---|---|---|
| 10,858,011 B1* | 12/2020 | Christensen | B60K 28/08 |
| 2004/0107033 A1 | 6/2004 | Rao et al. | |
| 2006/0038678 A1* | 2/2006 | Avneri | B61B 3/02 340/541 |
| 2006/0106538 A1* | 5/2006 | Browne | B60R 21/01 701/301 |
| 2015/0073662 A1* | 3/2015 | Schmudderich | B60W 30/16 701/41 |
| 2016/0325741 A1* | 11/2016 | Furst | B60W 30/08 |
| 2018/0113452 A1* | 4/2018 | Wiechers | F41H 13/0081 |
| 2019/0311625 A1* | 10/2019 | Anvari | H04W 4/02 |
| 2019/0384323 A1* | 12/2019 | Kuroda | G05D 1/0289 |
| 2020/0020234 A1* | 1/2020 | Cheng | G08G 1/0133 |
| 2020/0331496 A1* | 10/2020 | Cao | B60R 11/04 |
| 2021/0009060 A1* | 1/2021 | Huang | G06V 10/454 |
| 2021/0155185 A1* | 5/2021 | Christensen | B60R 21/0134 |

FOREIGN PATENT DOCUMENTS

| | | |
|---|---|---|
| CN | 105083193 A | 11/2015 |
| CN | 108146378 A | 6/2018 |
| CN | 108583495 A | 9/2018 |
| CN | 108622003 A | 10/2018 |
| DE | 8232628 U1 | 4/1983 |
| DE | 101 32 681 C1 | 8/2002 |
| DE | 103 26 001 A1 | 9/2004 |
| DE | 103 27 115 B3 | 11/2004 |
| DE | 10 2006 008 636 A1 | 8/2007 |
| DE | 10 2014 002 540 A1 | 8/2015 |
| DE | 10 2018 111 153 A1 | 11/2019 |
| EP | 3 312 810 A1 | 4/2018 |
| JP | 2017-124809 A | 7/2017 |
| KR | 20120063626 A | 6/2012 |
| WO | WO 2010/ 040 376 A1 | 4/2010 |

* cited by examiner

TRIGGERING AT LEAST ONE CRASH CUSHION OF AN UNMANNED VEHICLE

CROSS-REFERENCE TO RELATED PATENT APPLICATIONS

This patent application claims the benefit of German Patent Application No. 10 2019 119 093.2, filed Jul. 15, 2019, the entire teachings and disclosure of which are incorporated herein by reference thereto.

FIELD

Example embodiments of the invention relate to a method, an apparatus, and a computer program for triggering at least one crash cushion for an unmanned vehicle.

BACKGROUND

In the prior art, unmanned vehicles with a means of accommodating and transporting one or more consignments are known. Such an unmanned vehicle moves on pavements, bicycle paths and roads, for example autonomously or semi-autonomously (for example in a follow-me mode behind a person or by remote control). It crosses roads, pulls out behind corners of houses, or goes around bends. For example, because of the low height of the unmanned vehicle (for example compared to an upright person), it is easily overlooked by other road users, such as pedestrians or cyclists. There is therefore an increased risk of a collision between such an unmanned vehicle and other road users. This is accompanied by an increased risk that, in the event of a collision, the unmanned vehicle involved or the other road user involved will be harmed.

SUMMARY OF SOME EXEMPLARY EMBODIMENTS OF THE INVENTION

The present invention has therefore set itself the task inter alia of providing a method, an apparatus, a system, and a computer program for triggering at least one crash cushion of an unmanned vehicle.

According to the invention, a method is disclosed, wherein the method includes:

Obtaining and/or causing the obtaining of sensor information captured by at least one environment sensor of an unmanned vehicle, wherein the sensor information represents at least one object parameter of an object moving in relation to the unmanned vehicle, Determining, at least partly based on at least one object parameter, whether a collision between the unmanned vehicle and the object is imminent; and if it is determined that a collision between the unmanned vehicle and the object is imminent:

Determining, at least partly based on the at least one object parameter, at least one triggering parameter for triggering at least one crash cushion of the unmanned vehicle, and triggering and/or causing the triggering of at least one crash cushion according to the at least one triggering parameter, wherein the at least one crash cushion is triggered before the imminent collision.

The disclosed method is performed by an apparatus, for example the apparatus disclosed below.

According to the invention, an apparatus is disclosed, wherein the apparatus comprises means configured for performing the disclosed method or respective means for performing the steps of the disclosed method. One or more steps may be performed by the same means or different steps may be performed by different means. The means of the disclosed apparatus may include hardware and/or software components.

The means may include, for example, at least one memory with program instructions of a computer program (for example the computer program disclosed below) and at least one processor designed to perform program instructions from the at least one memory. Accordingly, an apparatus should also be understood as disclosed, the apparatus comprising at least one processor and at least one memory with program instructions, wherein the at least one memory and the program instructions are configured, together with the at least one processor, to cause the apparatus to perform and/or control the disclosed method.

Alternatively or additionally, the means of the apparatus may also include, for example, one or more wireless and/or wired communication interfaces (for example one or more wireless and/or wired network adapters) and/or one or more user interfaces (for example a keyboard, a mouse, a screen, a touch-sensitive screen, a speaker, a microphone, a camera, etc.).

For example, the apparatus further includes at least one sensor, which is configured to capture sensor information. Alternatively or additionally, the apparatus is configured, for example, to obtain sensor information from one or more sensors of the unmanned vehicle. The sensors of the unmanned vehicle are, for example, external to the apparatus (i.e. not part of the apparatus). For example, the apparatus is directly or indirectly communicatively connected to the sensors of the unmanned vehicle. An example of such a sensor is an environment sensor configured to at least partly monitor an environment of the unmanned vehicle and to capture sensor information (for example sensor information representing at least one object parameter of an object that is moving relative to the unmanned vehicle and that is located in the vicinity of the unmanned vehicle). Another example of such a sensor is a vehicle sensor that is configured to capture vehicle information that represents a vehicle parameter (for example an acceleration or speed) of the unmanned vehicle.

In addition, the apparatus is, for example, directly or indirectly communicatively connected to at least one crash cushion of the unmanned vehicle, so that the apparatus can, for example, trigger the at least one crash cushion.

The fact that the disclosed apparatus is communicatively connected, for example, to a sensor (for example an object sensor or a vehicle sensor) and a crash cushion of the unmanned vehicle, can be understood, for example, to mean that the connection between the apparatus and the respective component (i.e. the sensor and/or the crash cushion) is a wired and/or wireless communication connection (for example for information transmission). For this purpose, the apparatus includes, for example, one or more wireless and/or wired communication interfaces (for example one or more wireless and/or wired network adapters).

In addition, the apparatus may comprise one or more user interfaces (for example a keyboard, a mouse, a display screen, a touch-sensitive screen, a speaker, a microphone, a camera, etc.).

For example, the apparatus is an apparatus for the unmanned vehicle, or a module for the unmanned vehicle, or a part of the unmanned vehicle, for example in that the apparatus is installed in the unmanned vehicle. In this case the apparatus may be a control apparatus or a control module for the unmanned vehicle, for example.

In the example in which the apparatus is a part of the unmanned vehicle, the apparatus may be connected to the power supply of the unmanned vehicle, for example. Alternatively or in addition, the apparatus may also include its own power supply in the form of its own energy storage apparatus such as a battery and/or a capacitor. The apparatus's own power supply could, for example, be used as a replacement power supply. In this way, the operation of the apparatus is possible even in the event of a failure of the power supply of the unmanned vehicle.

With the apparatus as part of the unmanned vehicle, it is also possible, for example, to deactivate the apparatus (for example manually or automatically) and to use the unmanned vehicle independently of the disclosed use of the apparatus. This is advantageous, for example, in situations in which steps of the method performed by the apparatus, in particular the triggering of a crash cushion, are not desired.

According to another example, the apparatus is a server, such as a server remote from the unmanned vehicle (i.e. a server that is not part of the unmanned vehicle). Such a server can be, for example, both a physical server (i.e. a server with hardware and/or software components) and a virtual server. For example, a virtual server is intended to mean server functionality provided by hardware and/or software components of one or more physical servers (for example multiple servers of a so-called server cloud), by the multiple physical servers working together, for example, to provide the functionality of the virtual server.

According to the invention, a system is also disclosed, wherein the system includes:

the disclosed unmanned vehicle, and the disclosed apparatus, wherein the apparatus is a server remote from the unmanned vehicle.

According to the invention, a computer program is also disclosed, wherein the computer program includes program instructions, which are designed to cause, when performed by at least one processor, an apparatus (for example the disclosed apparatus) to perform the disclosed method.

The disclosed computer program is, for example, contained and/or stored on a computer-readable storage medium. A computer-readable storage medium is, for example, a physical and/or tangible storage medium. It is understood that the invention is not limited to this and the storage medium may alternatively also be a virtual storage medium, that is formed, for example, by multiple physical memories.

The characteristics of the disclosed method, the disclosed apparatus(s), the disclosed computer program, and the disclosed system are described below, partly by way of example.

The unmanned vehicle shall be understood to be, for example, a land vehicle that participates in traffic on land, in particular in foot traffic or in pedestrian areas (for example on pavements, inside buildings and in pedestrian zones). Preferably, the unmanned vehicle has neither a driver nor a passenger. For example, the unmanned vehicle is configured to move at least partly autonomously and/or automatically and/or remotely. For example, the unmanned vehicle is a robot and/or a drone.

The unmanned vehicle comprises at least the crash cushion, which is attached, for example, to an external side of the unmanned vehicle and/or opens outwards and/or unfolds (i.e. opens and/or unfolds from an external side of the unmanned vehicle) when it is triggered. For example, a crash cushion can be formed at least partly by a fluid bag, which, when the crash cushion is triggered, is filled with a fluid, and thus opens and/or unfolds. An example of such a crash cushion is an airbag apparatus comprising a gas bag (for example a plastic bag, in particular a nylon bag) and a gas generator, wherein the airbag apparatus is configured to fill the gas bag with gas generated by the gas generator when it is triggered. The gas generator is, for example, a pyrotechnic gas generator, a cold gas generator or a hybrid gas generator. For example, such a gas generator comprises an ignition unit and one or more propellant charges (for example a solid fuel, which is available in tablet form). For example, when triggering the airbag (for example by means of a current pulse), the ignition unit ignites one or more of the propellant charges, so that gas is generated, which leads to the filling of the gas bag with gas. Due to the provision of multiple propellant charges in the gas generator, an airbag apparatus can be triggered with different triggering intensities. For example, the lowest triggering intensity corresponds to the case in which only one propellant charge is ignited, and the highest triggering intensity corresponds, for example, to the case in which all propellant charges are ignited.

Furthermore, the unmanned vehicle comprises at least one sensor, which is configured to capture sensor information (for example sensor information representing at least one object parameter of an object that is moving relative to the unmanned vehicle, or vehicle information). As disclosed above, a sensor of the unmanned vehicle may be a sensor of the apparatus or external to the apparatus. Furthermore, the sensor of the unmanned vehicle may be one sensor of a number of sensors of the unmanned vehicle. For example, the sensors of such a number of sensors may be at least partly different sensors and/or at least partly arranged in different places (for example on different sides) of the unmanned vehicle.

For example, sensor information captured by a sensor (for example the environment sensor or a vehicle sensor) of the unmanned vehicle, if the sensor is also part of the apparatus, can be obtained by the apparatus capturing the sensor information by means of the at least one sensor. Alternatively, if the sensor is not part of the apparatus, sensor information captured by a sensor (for example the environment sensor or a vehicle sensor) of the unmanned vehicle can be obtained by the apparatus by receiving the sensor information from the sensor (for example via a communication connection).

For example, causing obtaining sensor information captured by a sensor of the unmanned vehicle should be understood to mean that the apparatus controls the unmanned vehicle and/or the sensor in such a way (for example by means of control information) that the unmanned vehicle and/or the sensor captures the sensor information and provides it to the apparatus (for example sends it via a communication connection to the apparatus), so that the apparatus obtains the information. For this purpose, the apparatus and the unmanned vehicle have appropriately configured communication interfaces, for example.

Sensor information captured by a sensor of the unmanned vehicle (for example sensor information captured by an environment sensor or sensor information captured by a vehicle sensor) is intended, for example, to be a quantitative or qualitative representation of a chemical or physical property captured by the sensor (for example in the form of a measured value of a chemical or physical property captured by a sensor) and/or an ambient condition captured by the sensor (for example in the form of an image captured by an optical sensor such as a camera).

Accordingly, a parameter represented by sensor information (for example at least one object parameter or a vehicle parameter) for example, should be understood to be a qualitative or quantitative representation of a measured value of a physical and/or chemical property (for example a speed or acceleration) captured by a sensor (for example an environment sensor or a vehicle sensor). A quantitative representation of a measured value of a physical and/or chemical property may, for example, indicate the measured value of the property captured by the sensor; and a qualitative representation of a physical and/or chemical property may represent, for example, an indication of whether the measurement value of the physical and/or chemical property captured and/or determined by the sensor is above or below a predetermined threshold value or lies within a predetermined measured value range. Furthermore, a parameter represented by sensor information (for example at least one object parameter or vehicle parameter) should also be understood to be a parameter that can be determined based on the sensor information. For this purpose, it may be provided to further process the sensor information in order to obtain the parameter represented by the sensor information. For example, an object recognition and object classification algorithm may be applied to sensor information representing an image captured by an optical sensor such as a camera to detect and/or classify an object contained in the image, so that the object class of the captured object is determined as an object parameter, for example.

It is understood that sensor information can represent multiple parameters (for example multiple object parameters or vehicle parameters). It is therefore conceivable, for example, that sensor information represents the time variation of a parameter. Alternatively or additionally, sensor information can represent multiple different parameters. For example, it should also be understood as disclosed that a single piece of sensor information represents a minimum number of parameters (for example at least one parameter, at least two parameters, etc.).

The fact that the sensor information captured by the environment sensor of the unmanned vehicle represents an object parameter of an object can be understood accordingly to mean that this sensor information represents a qualitative or quantitative representation of at least one measured value of the chemical or physical property of the object captured by the environment sensor or the object parameter of the object can be determined based on this sensor information. An example of the object parameter of the object is a speed, an acceleration, an object class, or a distance of the object.

The object is, for example, a road user (for example a person and/or a vehicle) or an object in an environment of the unmanned vehicle (for example an environment that can be captured by the sensor of the unmanned vehicle). The fact that the object is moving relative to the unmanned vehicle, for example, should be understood to mean that the unmanned vehicle and the object are approaching or moving away from each other. The object can be moving or can be at rest.

For example, determining whether a collision between the unmanned vehicle and the object is imminent is performed in accordance with one or more (for example predetermined) rules such as an algorithm or a decision model. The fact that determining whether a collision between the unmanned vehicle and the object is imminent is at least partly based, for example, on the at least one object parameter, should be understood to mean that the at least one object parameter is taken into account when determining whether a collision between the unmanned vehicle and the object is imminent.

It is understood that in addition to the at least one object parameter, one or more other object parameters (for example represented by the sensor information) or other parameters (for example vehicle parameters of the unmanned vehicle) can be taken into account.

For example, the rules can specify for which object parameters (for example for which qualitative or quantitative representation of at least one measured value of at least one chemical or physical property of the object captured by the environment sensor) or for which combination of object parameters it should be determined that a collision between the unmanned vehicle and the object is imminent. In a simple example, the rules may specify, for example, that a collision between the unmanned vehicle and the object is imminent if an object parameter represented by the sensor information indicates that the object is approaching the unmanned vehicle at a speed greater than or equal to a predetermined threshold value (for example 3 m/s) and the distance of the object from the unmanned vehicle is less than or equal to a predetermined threshold value (for example 0.3 m).

It is understood that there is no need for a collision to occur if it is determined that a collision is imminent. For example, a collision between the unmanned vehicle and the object is to be understood as a crash between the unmanned vehicle and the object. In this crash, there is physical contact between the unmanned vehicle and the object, which may result in damage, i.e. collision damage to the unmanned vehicle and/or the object. For example, if the object colliding with the unmanned vehicle is a person (for example a pedestrian or a cyclist), the collision may result in injury to the person.

If it is determined that a collision between the unmanned vehicle and the object is imminent, the determination of at least one triggering parameter for triggering the at least one crash cushion of the unmanned vehicle and the triggering and/or causing of the triggering of at least one crash cushion are performed. It may be provided, for example, that these steps (i.e. determining the triggering parameter and triggering and/or causing the triggering of the at least one crash cushion) are performed only if it is determined that a collision between the unmanned vehicle and the object is imminent.

The at least one triggering parameter for triggering the at least one crash cushion is configured, for example, to at least partly control the triggering of the at least one crash cushion. For this purpose, the at least one triggering parameter determines, for example, the at least one crash cushion, a triggering intensity, a triggering volume, and/or a triggering time for triggering the at least one crash cushion. As detailed below, the at least one crash cushion can be part of a plurality of crash cushions. In this case, the at least one triggering parameter can determine, for example, which crash cushion(s) of the plurality of crash cushions should be triggered. Furthermore, if more than one crash cushion of the plurality of crash cushions is to be triggered, these multiple crash cushions can be triggered at least partly according to different triggering parameters.

The determination of the at least one triggering parameter for triggering the at least one crash cushion of the unmanned vehicle is performed, for example, according to one or more (for example predetermined) rules, such as an algorithm or a decision model. That the determination of at least one triggering parameter for the triggering of at least one crash cushion is based at least partly on the at least one object parameter should be understood, for example, in such a way that the object information is taken into account in determining at least one triggering parameter for triggering the at least one crash cushion. It is understood that in addition to the at least one object parameter, one or more other object parameters (for example represented by the sensor information) or other parameters (for example vehicle parameters of the unmanned vehicle) can be taken into account. In addition to the at least one triggering parameter, one or more other triggering parameters for triggering the at least one crash cushion of the unmanned vehicle may be determined.

For example, the rules can specify for which object parameters (for example for which qualitative or quantitative representation of at least one measured value of at least one chemical or physical property of the object captured by the environment sensor) or for which combination of object parameters triggering parameter(s) should be determined. In a simple example, the rules may specify, for example, that the at least one crash cushion should be triggered with a first triggering intensity (for example a gas pressure with which the gas bag of an airbag apparatus is filled by the gas generator when triggering with gas), if the at least one object parameter represented by the sensor information indicates that the object is approaching the unmanned vehicle at a speed that is less than a predetermined threshold value (for example 5 m/s), and that the at least one crash cushion should be triggered with a second triggering intensity if at least one object parameter represented by the sensor information indicates that the object is approaching the unmanned vehicle at a speed greater than or equal to the specified threshold value (for example 5 m/s). For example, the first triggering intensity is lower than the second triggering intensity.

The fact that the triggering of the at least one crash cushion is performed according to the at least one triggering parameter, for example, should be understood to mean that at least one triggering parameter is taken into account in the triggering of at least one crash cushion, for example in that triggering the at least one crash cushion is controlled in such a way that the at least one triggering parameter is complied with.

Causing the triggering of the at least one crash cushion is to be understood to mean, for example, that the disclosed apparatus controls the unmanned vehicle (for example a control apparatus of the unmanned vehicle) and/or the at least one crash cushion of the unmanned vehicle in such a way (for example by means of control information) that the at least one crash cushion is triggered. This can be understood, for example, to mean that the crash cushion is triggered by a suitable trigger mechanism (for example an ignition unit).

The triggering of the at least one crash cushion of the unmanned vehicle shall be performed in such a way that the at least one crash cushion is triggered before the imminent collision. For this purpose, it is conceivable, for example, that the at least one crash cushion (1) is triggered immediately (for example as soon as possible) after determining that a collision is imminent, or (2) at a certain time (for example determined by a further triggering parameter).

The triggering of the at least one crash cushion before the imminent collision according to the at least one triggering parameter is particularly advantageous, since damage as a result of an imminent collision, for which there is an increased risk in relation to an unmanned vehicle, for example due to its small size compared to other road users, can be prevented or reduced particularly effectively. The triggering of the at least one crash cushion may be advantageous in particular, since the at least one crash cushion is triggered according to the at least one determined triggering parameter at a time before the imminent collision between the unmanned vehicle and an object (for example at a time before physical contact between the unmanned vehicle and the object when the imminent collision actually occurs).

In contrast to the triggering of at least one crash cushion, according to conventional triggering methods, according to which crash cushions are triggered only after a collision between the unmanned vehicle and an object has already occurred, the parties to the collision can only be protected from further collision damage after the time of triggering and thus only after a collision has already actually occurred. With regard to this triggering only after a collision has already occurred, it is also conceivable that crash cushions according to conventional triggering methods can no longer be triggered according to a required triggering parameter (for example according to a required triggering intensity, for example in the form of a required speed at which the crash cushion opens) in order to protect against subsequent collision damage. Against this background, the triggering of at least one crash cushion at a time before the imminent collision may be particularly advantageous, since, for example, a lower triggering intensity compared to conventional triggering methods (for example a lower speed at which the crash cushion opens) can already be sufficient to protect against collision damage.

It is understood that, despite determining at least one triggering parameter and triggering at least one crash cushion according to the at least one triggering parameter, collision damage due to the imminent collision between the unmanned vehicle and an object is possibly not reduced or prevented. This can be the case, for example, due to uncertainties (for example errors or simplifications when determining at least one triggering parameter).

In an exemplary embodiment of the invention, determining whether a collision between the unmanned vehicle and the object is imminent includes:

determining a probability of the imminent collision occurring at least partly based on the at least one object parameter.

The fact that determining a probability for the occurrence of the imminent collision is at least partly based on at least one object parameter should be understood, for example, to mean that at least one object parameter is taken into account when determining a probability for the imminent collision occurring.

For example, it is conceivable that for determining a probability of the imminent collision occurring, a speed of the object and/or a distance of the object from the unmanned vehicle is/are taken into account. For example, according to this example, the faster the object is moving and/or the shorter the distance of the object from the unmanned vehicle, the greater the probability of the imminent collision occurring. It is understood that in addition to the at least one object parameter, one or more other object parameters (for example represented by the sensor information) or other parameters (for example vehicle parameters of the unmanned vehicle) can be taken into account.

Accordingly, whether a collision between the unmanned vehicle and the object is imminent may include, for example, checking whether the probability of the imminent collision exceeds a predetermined threshold (for example 50%, 75% or 90%). The threshold may have been determined, for example, by systematic experiment and/or based on machine learning.

In an exemplary embodiment of the invention, the determination as to whether a collision between the unmanned vehicle and the object is imminent is made at least partly based on a decision model obtained by machine learning.

For example, the decision model obtains the at least one object parameter as an input parameter and returns a probability that a collision with the object is imminent as the output parameter. Examples of such a decision model are an artificial neural network or an AI (artificial intelligence) based decision matrix.

For example, the decision model is obtained as a result of a learning phase according to a machine learning algorithm (for example an algorithm according to the deep learning method). In the learning phase, the decision model is trained based on object parameters as an input parameter. The object parameters can be obtained during systematic experiments, for example.

In an exemplary embodiment of the invention, the unmanned vehicle comprises a plurality of crash cushions.

One or more (for example each) of the crash cushions of the plurality of crash cushions may, for example, be arranged at another point on an external side of the unmanned vehicle and/or at least partly open in another direction and/or unfold when the respective crash cushion is triggered. The plurality of crash cushions may be arranged at least partly in the form of a matrix on an external side of the unmanned vehicle. Furthermore, the plurality of crash cushions may differ at least partly (for example in shape and/or size).

For example, one or more of the crash cushions of the plurality of crash cushions may be arranged on the front, rear, right and/or left external side of the unmanned vehicle when seen in the direction of travel of the unmanned vehicle and may at least substantially open or unfold away from the respective external side, so that the crash cushions of the plurality of crash cushions arranged on the front external side of the unmanned vehicle at least substantially open and/or unfold in the direction of travel when triggered.

For example, the method also includes:

determining, at least partly based on at least one object parameter, which at least one crash cushion of the plurality of crash cushions should be triggered.

It is conceivable, for example, that determining whether a collision between the unmanned vehicle and the object is imminent further includes the determination of which direction and/or on which external side of the unmanned vehicle a collision with the object is imminent (for example at the front, rear, left, right external side) when seen in the direction of travel of the unmanned vehicle, for example at least partly based on the at least one object parameter (for example, a direction of movement) of the object. If, accordingly, it is determined, for example, that a collision between the unmanned vehicle and the object is imminent and that this collision is imminent on a particular external side of the unmanned vehicle, it can be determined, for example, that at least one crash cushion of the plurality of crash cushions is triggered, which is arranged on the specific external side of the unmanned vehicle on which the collision is imminent. This method is advantageous, for example, in order to specifically reduce and/or prevent collision damage due to an imminent collision and to use the plurality of crash cushions particularly efficiently (for example by avoiding unnecessary triggering of the plurality crash cushions).

It should also be understood as disclosed that determining which at least one crash cushion of the plurality of crash cushions is triggered, in addition to the at least one object parameter, can be based on one or more other object parameters (for example represented by the sensor information) or other parameters (for example vehicle parameters of the unmanned vehicle).

Moreover, it is further understood as disclosed that with regards to the plurality of crash cushions which the unmanned vehicle comprises, it can be determined for example that more than one crash cushion (for example 2, 3 or more crash cushions) of the plurality of crash cushions should be triggered. For example, it can be determined that these multiple crash cushions are triggered at least partly according to different triggering parameters. For example, it can be achieved that the multiple crash cushions are triggered, for example, simultaneously or time-shifted relative to each other or, for example, triggered with the same or different triggering intensities.

As a result of the determination, for example, a triggering parameter is obtained, which determines which at least one crash cushion of the plurality of crash cushions should be triggered. For this purpose, the triggering parameter can represent (for example identify) at least one crash cushion of the plurality of crash cushions, for example. It is understood that the triggering parameter can further determine, for example, a triggering intensity, a triggering volume, and/or a triggering time for triggering the at least one crash cushion.

In an exemplary embodiment of the invention, the at least one triggering parameter determines the at least one crash cushion, a triggering intensity, a triggering volume, and/or a triggering time for triggering the at least one crash cushion.

For example, a triggering intensity of a crash cushion is characteristic of the period during which the crash cushion opens and/or unfolds when triggered, the speed at which the crash cushion opens and/or unfolds when triggered, and/or the pressure at which the crash cushion opens and/or unfolds when triggered.

A triggering volume of a crash cushion should be understood, for example, to mean the (for example maximum) volume of the opened and/or unfolded crash cushion after triggering.

For example, the triggering time of a crash cushion describes the time at which the crash cushion is to be triggered (for example, the time at which the opening and/or unfolding of the crash cushion should begin).

As disclosed above, an example of a crash cushion is an airbag apparatus comprising a gas bag (for example a plastic bag, in particular a nylon bag) and a gas generator, wherein the airbag apparatus is configured to fill the gas bag with gas generated by the gas generator when triggered. For example, the gas generator comprises an ignition unit and one or more propellant charges (for example a solid fuel, which is present in tablet form). For example, when the airbag is triggered (for example by means of a current pulse), the ignition unit ignites one or more of the propellant charges, resulting in the generation of gas that leads to the filling of the gas bag with gas. Due to the provision of multiple propellant charges in the gas generator, an airbag apparatus can be triggered with different triggering intensities and triggering volumes. In this case, the lowest triggering intensity and/or the smallest triggering volume corresponds, for example, to the case in which only one propellant charge is ignited, and the greatest triggering intensity and/or the largest triggering volume corresponds, for example, to the case in which all propellant charges are ignited. Accordingly, a triggering parameter may determine the triggering intensity and/or the triggering volume of an airbag apparatus in that it specifies the number of propellant charges to be ignited by the ignition unit. Furthermore, a triggering parameter may determine the time of triggering of an airbag apparatus, in that it specifies the time at which the ignition unit is to ignite the propellant charge(s).

In an exemplary embodiment of the invention, the at least one object parameter of the object represents at least one of the following:
- a position of the object,
- a distance of the object from the unmanned vehicle,
- an object class of the object,
- a direction of movement of the object,
- a speed of the object, and/or
- an acceleration of the object.

For example, a position of an object (for example of the object) is an absolute position or a relative position (for example relative to the unmanned vehicle). Such a position can be represented, for example, in the form of a position specification, which refers, for example, to an arbitrarily specified absolute or relative coordinate system. A position of an object relative to the unmanned vehicle can be determined, for example, based on a sequence of multiple images captured by an optical sensor (for example a camera) of the unmanned vehicle.

For example, a distance of an object (for example of the object) from the unmanned vehicle is a Euclidean or geodesic distance between the object and the unmanned vehicle. Such a distance between such an object and the unmanned vehicle can be captured, for example, by a distance sensor (for example a distance sensor in the form of an ultrasonic sensor or a radar sensor) of the unmanned vehicle.

For example, an object class of an object (for example, of the object) is one object class of a plurality of predetermined object classes. Examples of such object classes are: moving objects and non-moving objects. These two exemplary object classes can be subdivided even more finely as follows: a land vehicle such as a bicycle, a motorcycle, a car, or a truck as well as pedestrians as object classes for "moving objects" and street furniture (for example a bench, traffic lights, an advertising column, or a road sign), a building, or a plant as object classes for "non-moving objects". For example, a position of an object relative to the unmanned vehicle can be determined based on an image captured by an optical sensor (for example a camera) of the unmanned vehicle (for example according to a predetermined algorithm such as a predetermined segmentation, image recognition and/or classification algorithm).

For example, a direction of movement of an object (for example of the object) is to be understood as the direction in which the object is moving. This direction can be represented, for example, without reference to the unmanned vehicle (for example by specifying a point of the compass) or with reference to the unmanned vehicle (for example by specifying an angle which the direction of movement of the object includes with a direction of movement of the unmanned vehicle). It is also conceivable that the direction of movement as an object parameter of an object is limited to an indication of whether or not the object is moving towards the unmanned vehicle.

A speed of an object (for example of the object) can be understood, for example, to be without reference to the unmanned vehicle (for example as an absolute speed) or with reference to the unmanned vehicle (for example as a relative speed or a differential speed). Furthermore, it can be an average speed or an instantaneous speed, for example.

An acceleration of an object (for example of the object) can be understood, for example, to be without reference to the unmanned vehicle (for example as an absolute acceleration) or with reference to the unmanned vehicle (for example as a relative acceleration or a differential acceleration). In particular, it should be understood as disclosed that the acceleration of an object indicates a change in the speed of the object and thus a positive acceleration (increase in the speed of the object) or a negative acceleration (decrease in the speed of the object) of the object is conceivable.

A direction of movement, a speed and/or an acceleration of an object can be captured, for example, by a radar or lidar sensor of the unmanned vehicle.

In an exemplary embodiment of the invention, the at least one environment sensor of the unmanned vehicle is one of the following sensors: a temperature sensor (for example a thermometer, a thermocouple and/or a thermal resistance), an electromagnetic sensor (for example a radar sensor), an acoustic sensor (for example a microphone, a noise sensor and/or an ultrasonic sensor) or an optical sensor (for example an infrared sensor, a light sensor, a brightness sensor, a photodiode, a photoresistor, an image sensor, an image camera, a CMOS sensor and/or a CCD sensor, a video camera and/or a lidar sensor).

In an exemplary embodiment of the invention, the method further includes:

Obtaining and/or causing the obtaining of vehicle information, wherein the vehicle information represents at least one vehicle parameter of the unmanned vehicle, and wherein determining whether a collision between the unmanned vehicle and the object is imminent is at least partly based on the at least one vehicle parameter and/or determining the at least one triggering parameter for triggering the at least one crash cushion of the unmanned vehicle is at least partly based on the vehicle parameter.

The fact that the vehicle information captured by the vehicle sensor of the unmanned vehicle represents a vehicle parameter of the unmanned vehicle can be understood, for example, to mean that this vehicle information represents a qualitative or quantitative representation of at least one measured value of a chemical or physical property of the unmanned vehicle captured by the vehicle sensor. An example of the vehicle parameter of the unmanned vehicle is a speed or acceleration of the unmanned vehicle.

The fact that determining whether a collision between the unmanned vehicle and the object is imminent is based on the at least one vehicle parameter is to be understood to mean, for example, that the at least one vehicle parameter is taken into account when determining whether a collision between the unmanned vehicle and the object is imminent.

As disclosed above, determining whether a collision between the unmanned vehicle and the object is imminent, for example, is performed according to one or more (for example predetermined) rules such as an algorithm or a decision model. For example, the rules can specify for which combination of object parameter(s) and vehicle parameter(s) it is to be determined that a collision between the unmanned vehicle and the object is imminent. For example, in a simple example, the rules can specify that if the object parameter represented by the sensor information indicates that the distance of the object from the unmanned vehicle is less than or equal to a predetermined threshold (for example 0.3 m), and the vehicle parameter represented by the vehicle information indicates that the unmanned vehicle is moving towards the object at a speed greater than or equal to a predetermined threshold (for example 5 m/s), it should be determined that a collision between the unmanned vehicle and the object is imminent.

As disclosed above, such vehicle information, which represents at least one captured vehicle parameter of the unmanned vehicle, can be obtained, for example, by capturing the vehicle parameter by at least one vehicle sensor of the unmanned vehicle. It is understood, however, that the present invention is not limited to this. Accordingly, it should be understood as disclosed that the at least one vehicle parameter is captured by at least one vehicle sensor of the unmanned vehicle. In this case, the at least one vehicle sensor of the unmanned vehicle is, for example, part of the apparatus which performs the method, or is external to that apparatus (i.e. is not part of the apparatus that performs the method).

The at least one vehicle sensor may be, for example, a speed sensor (for example a speedometer and/or a revolution rate sensor, wherein the captured revolution rate is, for example, proportional to the speed), an accelerometer (for example a piezoelectric accelerometer) or a rotation rate sensor (for example a gyroscope). It should be understood as disclosed that in the case of multiple vehicle sensors, the vehicle sensors may be different sensors.

For example, the at least one vehicle parameter represents at least one of the following:
a direction of movement of the unmanned vehicle,
a speed of the unmanned vehicle, and/or
an acceleration of the unmanned vehicle.

For example, a direction of movement of the unmanned vehicle is to be understood to be the direction in which the unmanned vehicle is moving. The direction of movement of the unmanned vehicle can be captured by a gyroscope, for example.

For example, a speed of the unmanned vehicle can be understood as an average speed or an instantaneous speed of the unmanned vehicle. The speed of the unmanned vehicle can be captured by a speed sensor, for example.

An acceleration of the unmanned vehicle should be understood, for example, to mean that the acceleration of the unmanned vehicle indicates a change in the speed of the unmanned vehicle and thus a positive acceleration of the unmanned vehicle (increase in the speed of the unmanned vehicle) or a negative acceleration of the unmanned vehicle (decrease in the speed of the unmanned vehicle) is conceivable. The acceleration of the unmanned vehicle can be captured, for example, by an accelerometer.

In an exemplary embodiment of the invention, the unmanned vehicle is an at least semi-autonomously driving and/or automatically driving vehicle and/or a remotely driven vehicle.

For example, an unmanned vehicle should be understood to be at least partly autonomously driving if the vehicle moves automatically on at least one part of a predetermined route (for example without the influence of a driver) and navigates automatically along the predetermined route. For example, an autonomous vehicle moves automatically along the entire route (for example without the influence of a driver) and navigates automatically along the entire route.

For example, an automatically driving vehicle is a vehicle that automatically follows a vehicle ahead or a person ahead (for example in a so-called follow-me mode).

For example, a remotely controlled vehicle is controlled by a remote driver (i.e. a driver who is not in the vehicle). Remote control in sight (i.e. the driver is still within sight of the unmanned vehicle) and remote control by teleoperation (i.e. the driver is out of sight of the vehicle and controls the vehicle using sensor information captured by sensors of the unmanned vehicle such as images captured by a camera of the unmanned vehicle) can be distinguished.

In an exemplary embodiment of the invention, the unmanned vehicle comprises means for accommodating and transporting one or more goods items. An example of these goods items are bulk goods or piece goods. In particular, such piece goods may also be a shipment such as a package, a parcel shipment (for example a parcel) and/or correspondence (for example a letter). A means of accommodating and transporting such a goods item is, for example, a compartment that can be closed by a door and/or flap for accommodating and transporting the goods. It is understood that the unmanned vehicle may also have multiple compartments that can be closed by means of a door and/or a flap for accommodating and transporting one or more goods items. The respective door and/or flap closes, for example, a housing and/or a body opening of the unmanned vehicle, through which the respective compartment of the vehicle is accessible.

In an exemplary embodiment of the invention, the unmanned vehicle is not intended for the transport of persons. This should be understood to mean, for example, that the unmanned vehicle is not configured to transport people (i.e. neither a driver nor passengers). For example, the unmanned vehicle is intended exclusively for accommodating and transporting one or more goods items.

Further advantageous exemplary embodiments of the invention are to be found in the following detailed description of some exemplary embodiments of the present invention, in particular in connection with the figures. However, the figures enclosed with the application are intended only for the purpose of clarifying, but not for determining the scope of protection of the invention. The enclosed drawings are not necessarily true to scale and are intended to reflect only the general concept of the present invention by way of example. In particular, features which are contained in the figures should by no means be regarded as a necessary component of the present invention.

BRIEF DESCRIPTION OF THE DRAWINGS

In the figures.

DETAILED DESCRIPTION

Figure 1:
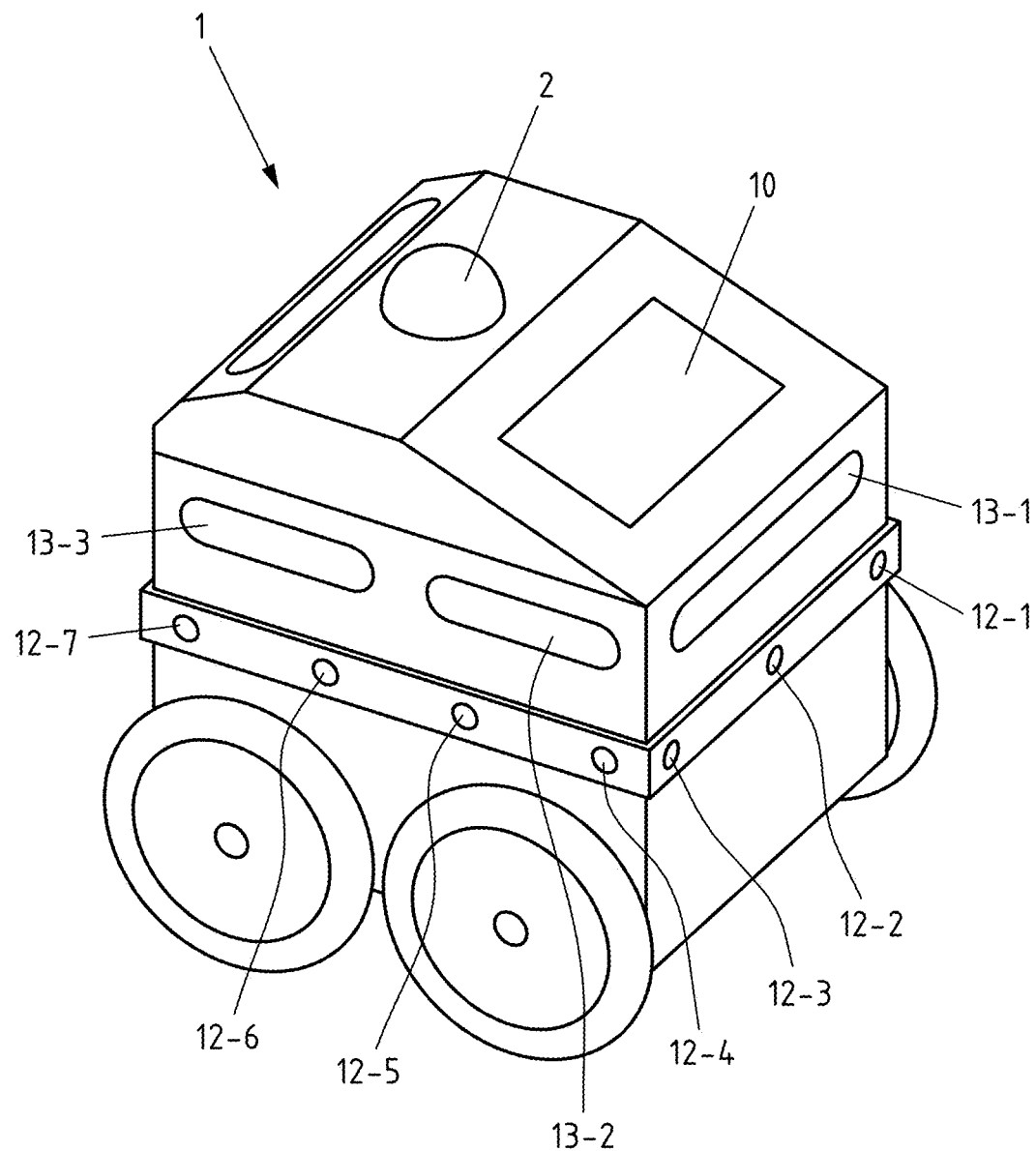
FIG. 1 shows a schematic representation of an exemplary embodiment of an unmanned vehicle according to the invention.

FIG. 1 is a schematic representation of an exemplary embodiment of an unmanned vehicle 1 according to the invention.

The unmanned vehicle 1 is a land vehicle and has a compartment 10 closed by a door. The unmanned vehicle 1 can transport a shipment in the compartment 10. For example, the unmanned vehicle 1 is an outdoor robot or a transport drone. For example, the unmanned vehicle is configured to move at least partly autonomously.

Figure 4:
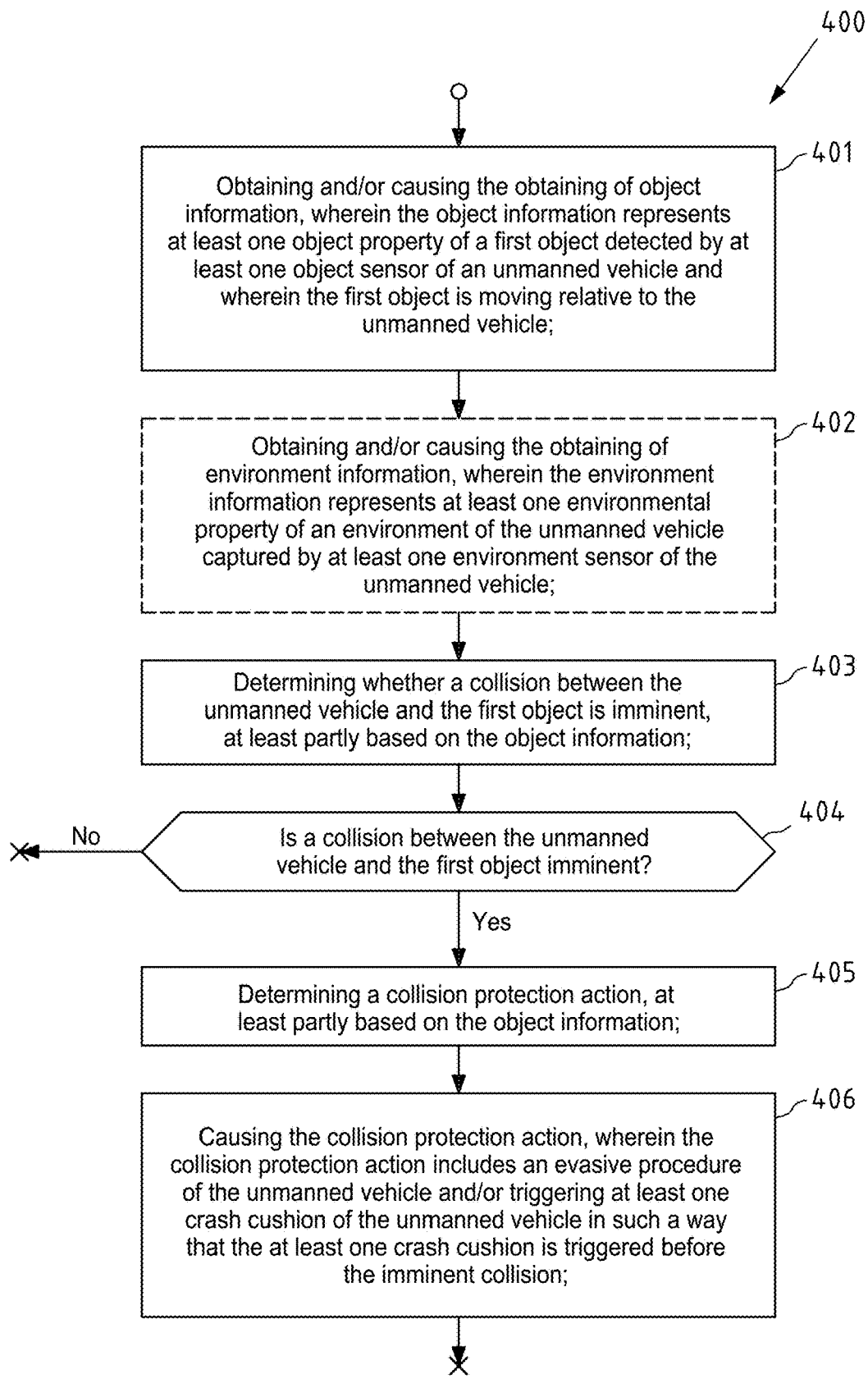
FIG. 4 shows a flowchart of an embodiment of a method according to the invention.

For example, the unmanned vehicle 1 has an apparatus 2 which is configured, for example, to perform a method according to the invention (for example the method according to the flowchart in FIG. 4).

Further, the unmanned vehicle 1 has multiple environment sensors 12-1 to 12-7, which are arranged on different external sides of the unmanned vehicle 1. The environment sensors 12-1 to 12-7 are configured, for example, to at least partly monitor an environment of the unmanned vehicle 1 and to capture sensor information that represents at least one object parameter of an object located in the environment of the unmanned vehicle. It is understood that the unmanned vehicle 1 has additional sensors in addition to the environment sensors 12-1 to 12-7 (for example environment sensors which may be located on the external sides of the unmanned vehicle 1 which are not visible in FIG. 1, and/or vehicle sensors). Also, the apparatus 2 may comprise one or more other sensors (for example environment sensors and/or vehicle sensors), which would thus be part of both the apparatus 2 and the unmanned vehicle 1.

It is assumed below by way of example that the environment sensors 12-1 to 12-7 are ultrasonic sensors, which are configured to capture ultrasonic sensor information (for example in the form of an ultrasonic signal transition time). For this purpose, the ultrasonic sensors 12-1 to 12-7 are each configured to emit an ultrasonic pulse and to receive a reflection of the ultrasonic pulse as well as to measure an ultrasonic signal transition time (i.e. the period between the emission of the ultrasonic pulse and the reception of the reflection of the ultrasonic pulse). Based on such an ultrasonic signal transition time, the distance between the unmanned vehicle 1 and the object at which the ultrasonic pulse was reflected can be determined. Furthermore, based on two successively emitted ultrasonic pulses and the ultrasonic signal transition times measured for the two ultrasonic pulses, it can be determined whether the object at which the respective ultrasonic pulses were reflected is approaching the unmanned vehicle 1 or is traveling away from it and, if the sending times of the two ultrasonic pulses are known, at what average differential speed the object has approached the unmanned vehicle 1 or traveled away from the unmanned vehicle 1. It is understood that the unmanned vehicle 1 additionally or alternatively may also comprise other sensors (temperature sensors, electromagnetic sensors, acoustic sensors, and/or optical sensors) as environment sensors 12-1 to 12-7.

The unmanned vehicle 1 comprises multiple crash cushions 13-1, 13-2 and 13-3 (i.e. a plurality of crash cushions 13-1 to 13-3) which are arranged on different external sides of the unmanned vehicle 1. It is understood that the unmanned vehicle 1 may include additional crash cushions (for example crash cushions which may be placed on the external sides of the unmanned vehicle 1 which are not visible in FIG. 1).

In the following, it is assumed by way of example that the crash cushions 13-1 to 13-3 are airbag apparatuses. As disclosed above, each of the airbag apparatuses 13-1 to 13-3 comprises, for example, a respective gas bag and a respective gas generator, wherein the airbag apparatus is configured to fill the gas bag with gas generated by the gas generator when triggered, so that the gas bag opens or unfolds. The gas bag, for example, is a plastic bag (for example a nylon bag). The gas generator is, for example, a pyrotechnic gas generator, a cold gas generation or a hybrid gas generator. For example, the respective gas generator of each of the airbag apparatuses 13-1 to 13-3 comprises two propellant charges. This allows each of the airbag apparatuses 13-1 to 13-3 to be triggered with two different triggering intensities. The lower triggering intensity corresponds, for example, to the case in which only one propellant charge of the respective airbag apparatus is ignited, and the higher triggering intensity corresponds, for example, to the case in which both propellant charges of the respective airbag apparatus are ignited.

In the present example according to FIG. 1 the ultrasonic sensors 12-1 to 12-7 and the airbag apparatuses 13-1 to 13-3 of the unmanned vehicle are connected communicatively to the apparatus 2 via one or more wired communication connections (for example via one or more bus systems such as one or more serial and/or parallel bus connections of the unmanned vehicle 1). For this purpose, the ultrasonic sensors 12-1 to 12-7 and the airbag apparatuses 13-1 to 13-3 have one or more corresponding wired communication interfaces. Alternatively or additionally, the ultrasonic sensors 12-1 to 12-7 and the airbag apparatuses 13-1 to 13-3 may also be communicatively connected to the apparatus 2 via a wireless communication connection. For this purpose, the ultrasonic sensors 12-1 to 12-7 and the airbag apparatuses 13-1 to 13-3 may comprise one or more wireless communication interfaces.

A wired communication connection should preferably be understood to mean a communication connection via a wired communication network such as an Ethernet communication network, a CAN bus system (Controller Area Network), a K-line bus system or a FlexRay bus system. Ethernet, for example, is specified in the standards of the IEEE-802.3 family. CAN is specified in the standards of the ISO 11898 family, K-line is specified in the ISO 9141 and ISO 14230-1 standards and FlexRay in the standards of the ISO 17458 family.

An example of a wireless communication connection is a communication connection according to a wireless communication technology such as Radio Frequency Identification (RFID) and/or Near Field Communication (NFC) and/or Bluetooth (for example Bluetooth version 2.1 and/or 4.0) and/or Wireless Local Area Network (WLAN). RFID and NFC are specified, for example, according to ISO standards 18000, 11784/11785 and ISO/IEC standards 14443-A and 15693. The Bluetooth specifications are currently available on the Internet at www.bluetooth.org. WLAN, for example, is specified in the standards of the IEEE-802.11 family.

Figure 2:
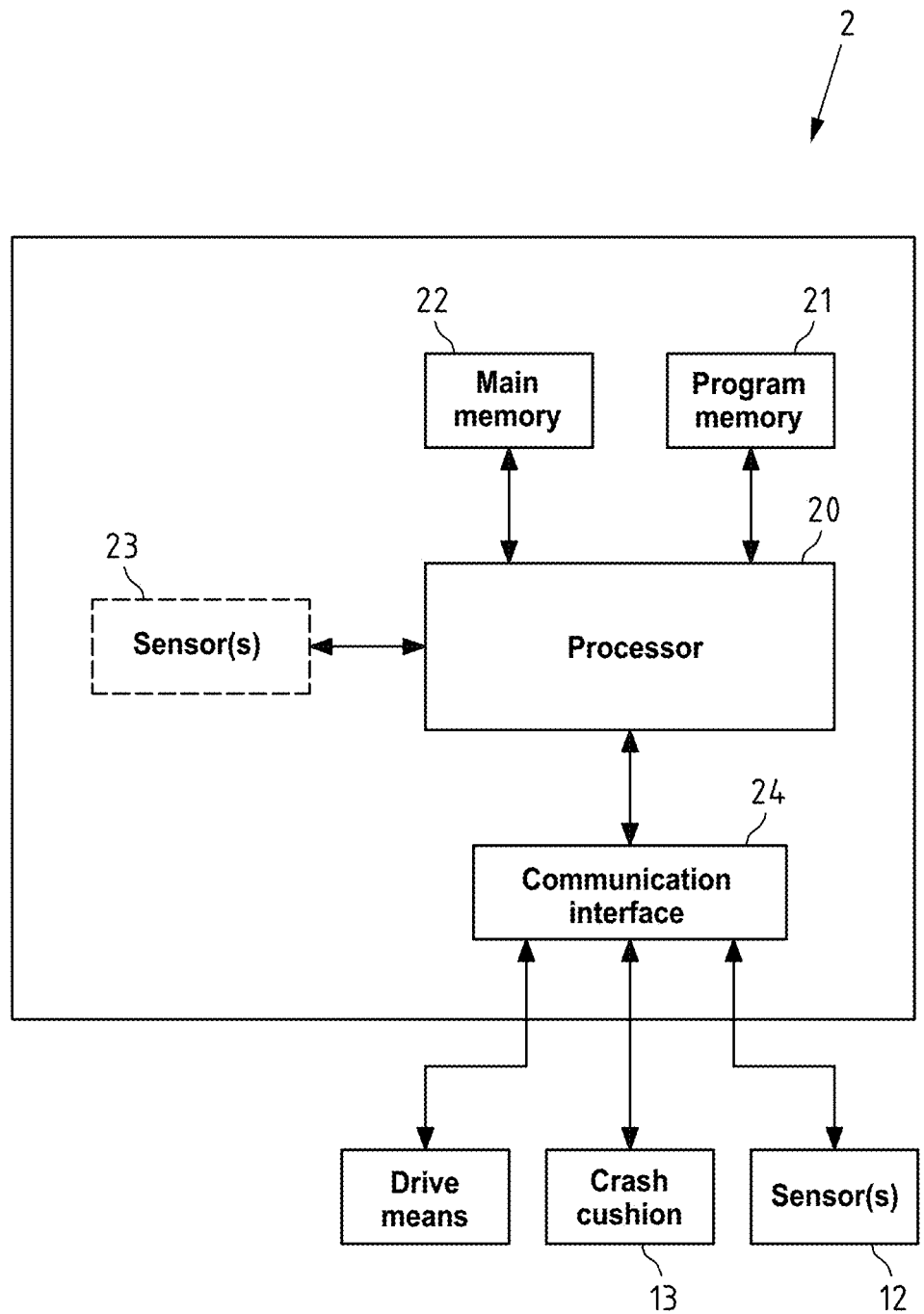
FIG. 2 shows a schematic representation of an exemplary embodiment of an apparatus according to the invention.

FIG. 2 is a schematic representation of an exemplary embodiment of an apparatus 2 (for example, the apparatus 2 shown in FIG. 1) according to the invention.

The apparatus 2 comprises, for example, a processor 20 and connected to the processor 20 a first memory as a program memory 21, a second memory as a main memory 22 and a wired communication interface 24. Furthermore, the apparatus 2 can optionally comprise one or more sensors 23 (for example an environment sensor).

For example, a processor such as the processor 20 is to be understood to be a microprocessor, a microcontrol unit, a microcontroller, a digital signal processor (DSP), an application-specific integrated circuit (ASIC) or a field programmable gate array (FPGA). Of course, the apparatus 2 can also include multiple processors 20.

The processor 20 performs program instructions stored in the program memory 21 and stores intermediate results or similar in the main memory 22, for example. The program memory 21 contains, for example, program instructions of a computer program, which include program instructions that cause the processor 20 to perform the disclosed method (for example the method according to the flowchart 400 shown in FIG. 4) and/or to control when the processor 20 performs these program instructions stored in the program memory 21.

The program memory 21 further contains, for example, the operating system of the apparatus 2, which is loaded at least partly in the main memory 22 and is executed by the processor 20 when starting the apparatus 2. In particular, when starting the apparatus 2 at least part of the core of the operating system is loaded into the main memory 22 and is executed by the processor 20.

An example of an operating system is a Windows, UNIX, Linux, Android, Apple iOS, and/or MAC OS operating system. In particular, the operating system allows the use of the apparatus 2 for data processing. For example, it manages resources such as a main memory and a program memory, provides inter alia basic functions to other computer programs through programming interfaces, and controls the performance of computer programs.

For example, a program memory such as the program memory 21 is a non-volatile memory such as a flash memory, a magnetic memory, an EEPROM memory (electrically erasable programmable read-only memory) and/or an optical memory. For example, a main memory such as the main memory 22 is a volatile or non-volatile memory, especially a random access memory (RAM) such as a static RAM memory (SRAM), a dynamic RAM memory (DRAM), a ferroelectric RAM memory (FeRAM), and/or a magnetic RAM memory (MRAM).

The main memory 22 and the program memory 21 can also be designed as one memory. Alternatively, the main memory 22 and/or the program memory 21 can each be formed by multiple memories. Furthermore, the main memory 22 and/or the program memory 21 may also be part of the processor 20.

The communication interface 24 of the apparatus 2 may be a wireless communication interface or a wired communication interface, wherein a wired communication interface is assumed below by way of example. The apparatus 2 can send and/or receive information by means of the communication interface 24.

For example, the apparatus 2 can receive sensor information from the environment sensors 12-1 to 12-7 of the unmanned vehicle 1 by means of the communication interface 24. In addition, the apparatus 2 can cause triggering of one or more of the airbag apparatuses 13-1 to 13-3 of the unmanned vehicle 1 via the communication interface 24, for example, by sending control information to the respective airbag apparatus to control the respective airbag apparatus and to control the triggering of the respective airbag apparatus. In this case, the triggering of the respective airbag apparatus can be controlled in such a way that it takes place according to one or more (previously determined) triggering parameters.

Figure 3:
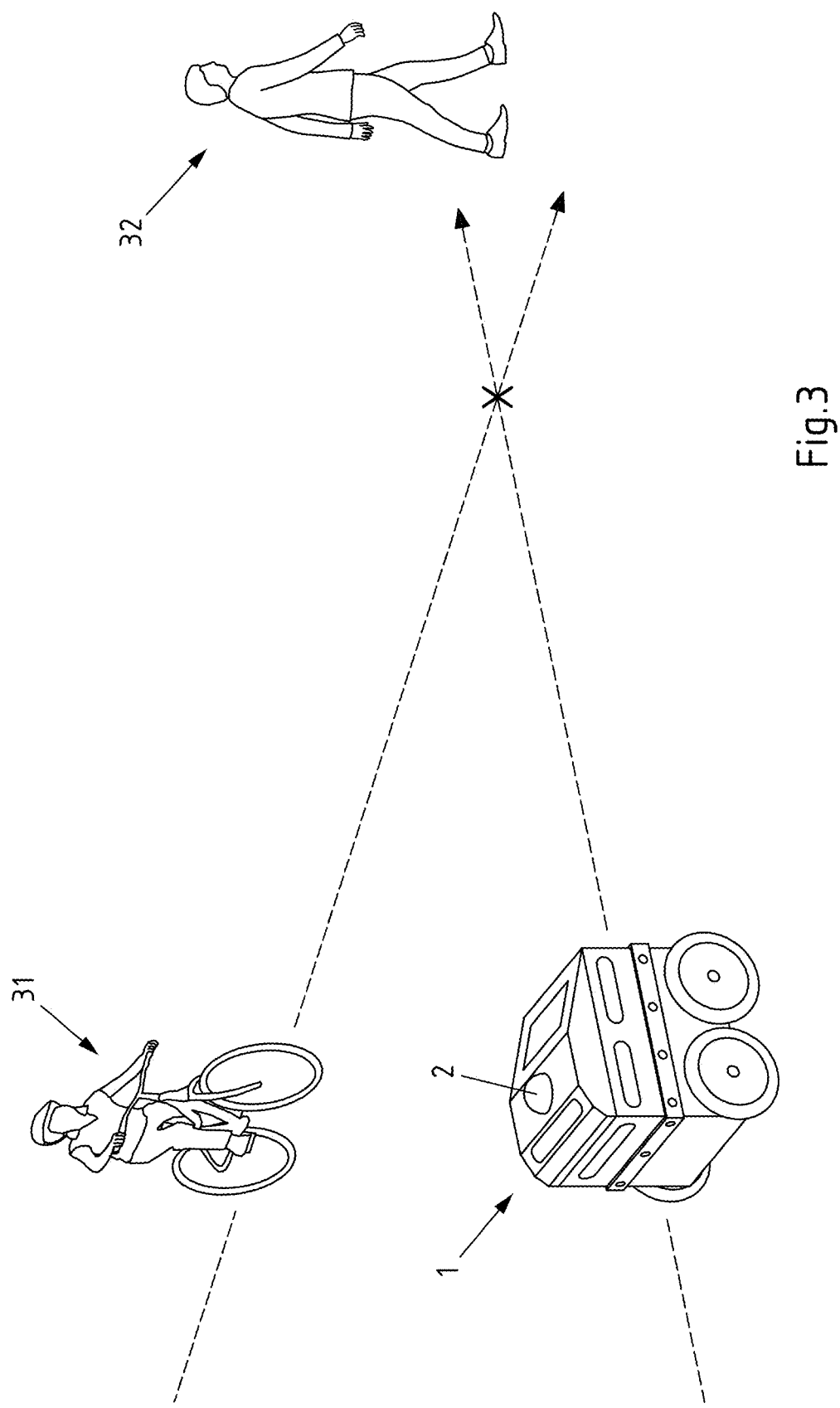
FIG. 3 shows a schematic representation of an exemplary situation in which a method according to the invention may proceed.

FIG. 3 is a schematic representation of a situation in which a method according to the invention can proceed, wherein the situation, for example, represents the unmanned vehicle 1 disclosed according to FIG. 1, which comprises the apparatus 2 disclosed according to FIG. 2.

It is assumed, for example, that the unmanned vehicle 1 is moving automatically and is following a person 32 (for example a parcel delivery driver) (for example in a follow-me mode). In addition, there is a cyclist 31 (for example a bicycle and a rider of the bicycle) in the vicinity of the unmanned vehicle 1, wherein the cyclist 31 is moving relative to the unmanned vehicle 1.

Due to the small size of the unmanned vehicle 1, for example, there is a risk that the cyclist 31 will overlook the unmanned vehicle 1, so that there could be a collision between the cyclist and the unmanned vehicle 1 as a result.

FIG. 4 shows a flowchart 400 of an exemplary embodiment of a method according to the invention, the steps 401 to 405 of which will be explained below by way of example with regard to the situation presented in FIG. 3. It is assumed by way of example that the following steps 401 to 405 of the method are performed by the apparatus 2 of the unmanned vehicle 1.

In a step 401, the apparatus 2 receives sensor information, wherein the sensor information is captured by at least one environment sensor of the environment sensors 12-1 to 12-7 of the unmanned vehicle 1 and represents at least one object parameter of the cyclist 31 as the object that is moving relative to the unmanned vehicle 1. For example, the sensor information represents the distance of the cyclist 31 from the unmanned vehicle 1 as an object parameter of the cyclist 31. It is understood that in step 401 multiple pieces of sensor information captured by at least one environment sensor of the environment sensors 12-1 to 12-7 of the unmanned vehicle 1 may also be obtained. For example, such multiple pieces of sensor information could represent the distance of the cyclist 31 from the unmanned vehicle 1 at consecutive times as object parameters of the cyclist 31. As disclosed above, an average differential speed of the cyclist 31 at which the cyclist 31 is approaching or moving away from the unmanned vehicle can be determined based on such a time profile of the distance.

In a step 402, the apparatus 2 determines whether a collision between the unmanned vehicle 1 and the cyclist 31 is imminent, at least partly based on the at least one object parameter which is represented by the sensor information obtained in step 401.

The determination in step 402 is performed, for example, according to one or more (for example predetermined) rules, such as an algorithm or a decision model. It is assumed below, for example, that the determination in step 402 is performed at least partly based on a decision model obtained by machine learning such as an artificial neural network or an AI based decision matrix. The decision model obtains the at least one object parameter, which is represented by the sensor information obtained in step 401, as an input parameter and, for example, outputs a probability of a collision between the unmanned vehicle 1 and the cyclist 31 as an output parameter. It is understood that the decision model can obtain further object parameters and/or vehicle parameters as input parameters and can thus take these into account when determining the probability of an occurrence of a collision between the unmanned vehicle 1 and the cyclist 31.

If the probability of a collision between the unmanned vehicle 1 and the cyclist 31 obtained as the output parameter of the decision model exceeds a predetermined threshold value (for example 50%, 75% or 90%), it may be provided, for example, that step 402 determines that a collision between the unmanned vehicle 1 and the cyclist 31 is imminent.

Otherwise, for example, it is provided that in step 402 it is determined that no collision between the unmanned vehicle 1 and the cyclist 31 is imminent. For example, in this case the method is terminated in step 403.

If, on the other hand, step 402 determines that a collision between the unmanned vehicle 1 and the cyclist 31 is imminent, the method will be continued with step 404.

In step 404, the apparatus 2 determines at least one triggering parameter for triggering at least one airbag apparatus of the airbag apparatuses 13-1 to 13-3 of the unmanned vehicle 1, at least partly based on the at least one object parameter, which is represented by the sensor information obtained in step 401. It is understood that multiple triggering parameters can also be determined in step 404. For example, the triggering parameter determined in step 404 determines the airbag apparatus(es) of the airbag apparatuses 13-1 to 13-3 which is/are to be triggered and/or the respective triggering time and/or the respective triggering intensity.

In the situation represented in FIG. 3 by way of example, the cyclist 31 is threatening to collide with the front outside of the unmanned vehicle 1 when seen in the direction of travel, so that the triggering parameter is determined, for example, in such a way that it specifies that the airbag apparatus 13-1 arranged on this external side of the unmanned vehicle 1 is to be triggered.

Furthermore, a further triggering parameter is determined in step 404, for example so that it determines the triggering time in such a way that the airbag apparatus 13-1 is triggered before the imminent collision.

In addition, another triggering parameter is determined in step 404, which determines the triggering intensity. For this purpose, for example, it may be provided that the triggering parameter is determined in such a way that it specifies that the airbag apparatus 13-1 should be triggered with the higher triggering intensity when the cyclist 31 is approaching the unmanned vehicle 1 with an average differential speed greater than or equal to a predetermined threshold (for example 5 m/s). Otherwise, for example, the triggering parameter may be specified in such a way that it specifies that the airbag apparatus 13-1 should be triggered with the lower triggering intensity.

In step 405, the triggering and/or the causing of triggering of the at least one airbag apparatus of the airbag apparatuses 13-1 to 13-3 is/are performed according to the at least one triggering parameter determined in step 404, wherein at least one airbag apparatus is triggered before the imminent collision.

In the present example, in step 405 the apparatus 2 triggers the airbag apparatus 13-1 according to the triggering parameters determined in step 404, wherein the airbag apparatus 13-1 is triggered before the imminent collision between the unmanned vehicle 1 and the cyclist 31, for example in that the apparatus 2 controls the airbag apparatus in such a way that the propellant charge(s) of the airbag apparatus 13-1 is/are ignited according to the triggering parameters determined in step 404.

The triggering of the airbag apparatus 13-1 in step 405 before the imminent collision according to the triggering parameters determined in step 404 is particularly advantageous, since damage as a result of an imminent collision, for which there is an increased risk with respect to an unmanned vehicle 1 for example due to its small size compared to other road participants, can be prevented or reduced particularly effectively. The triggering of an airbag apparatus 13-1 in step 405 may be advantageous in particular for this reason, since the airbag apparatus 13-1 is triggered according to the at least one determined triggering parameter at a time before the imminent collision between the unmanned vehicle 1 and the cyclist 31 (for example at a time before the physical contact between the unmanned vehicle 1 and the cyclist 31, if the imminent collision actually occurs).

In contrast to the triggering of an airbag apparatus as a crash cushion in step 405, according to conventional triggering methods, according to which crash cushions are only triggered after a collision between the unmanned vehicle 1 and the cyclist 31 has already occurred, the persons involved in the collision can be protected from further collision damage only after the time of triggering and thus only after a collision has already occurred. With regard to this triggering only after a collision has already occurred, it is also conceivable that crash cushions according to conventional triggering methods can no longer be triggered according to a required triggering parameter (for example according to a required triggering intensity, for example in the form of a required speed at which the crash cushion opens) in order to protect against subsequent collision damage. Against this background, the triggering of an airbag apparatus as a crash cushion in step 405 may be advantageous in particular because a lower triggering intensity (for example a lower speed at which the crash cushion opens) can be sufficient to protect against collision damage compared to conventional triggering methods.

In the present example it is understood that despite determining at least one triggering parameter in step 404 and triggering the airbag apparatus 13-1 as the at least one crash cushion in step 405 according to the at least one triggering parameter, collision damage due to the imminent collision between the unmanned vehicle 1 and the cyclist 31 is possibly not reduced or prevented. This can be the case, for example, due to uncertainties (for example errors or simplifications when determining the at least one triggering parameter in step 405 etc.).

Figure 5:
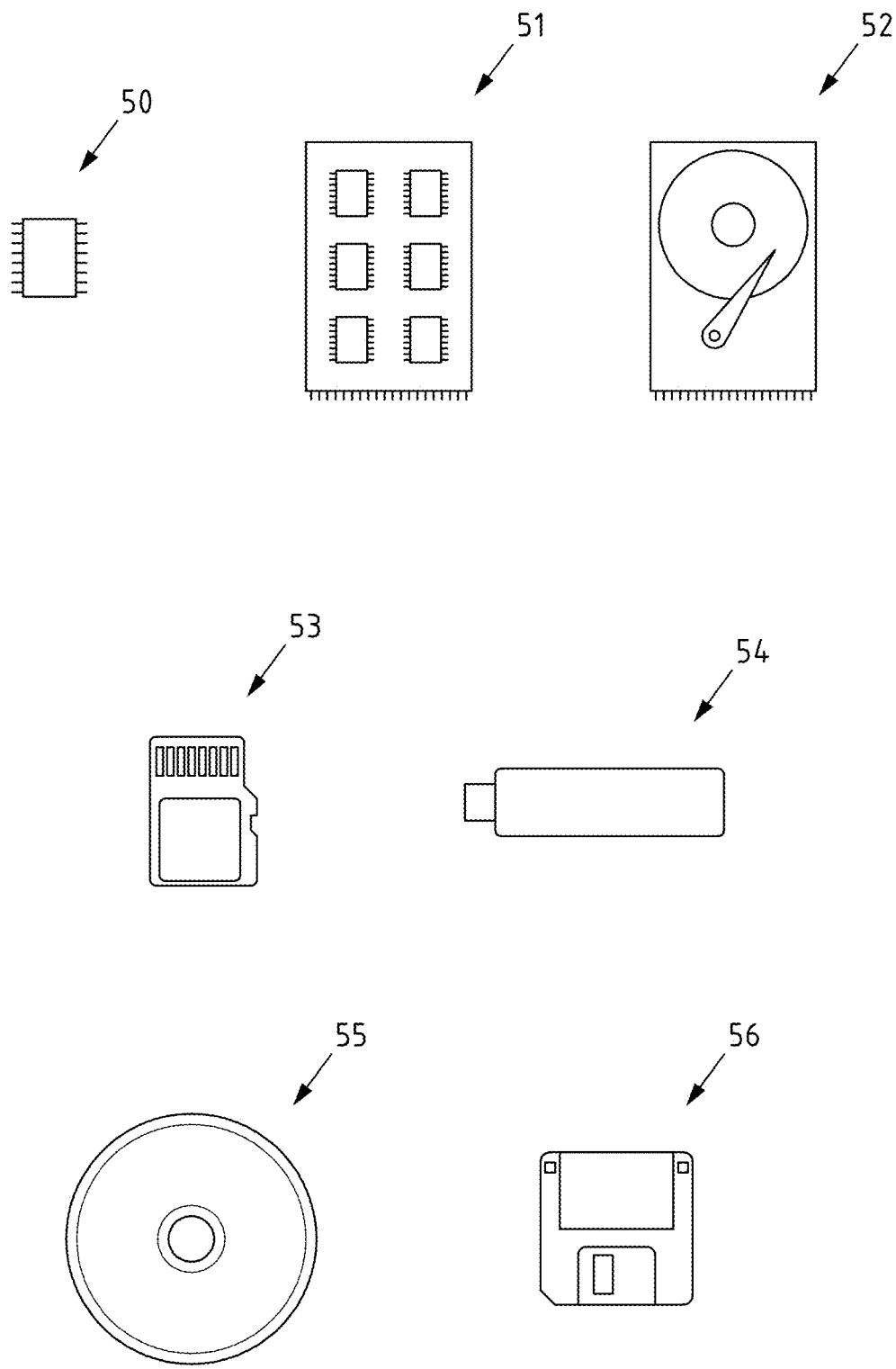
FIG. 5 shows exemplary embodiments of storage media.

FIG. 5 finally shows exemplary embodiments of memory media on which an embodiment of a computer program according to the invention may be stored. The storage medium may be, for example, a magnetic, electrical, optical, and/or other memory medium. The memory medium may be, for example, part of a processor (for example the processor 20 of FIG. 2), for example a (non-volatile or volatile) program memory of the processor or a part thereof (for example memory 21 in FIG. 2). Exemplary embodiments of a memory medium include a flash memory 50, an SSD hard drive 51, a magnetic hard drive 52, a memory card 53, a memory stick 54 (for example a USB stick), a CD-ROM or a DVD 55 or a floppy disk 56.

The exemplary embodiments of the present invention described in this specification should also be understood to be disclosed in all combinations with each other. In particular, the description of a feature covered by an embodiment, unless explicitly stated to the contrary—should not be understood in the present case as meaning that the feature is indispensable or essential for the function of the embodiment. The sequence of the steps of the method described in this specification in the individual flow diagrams is not mandatory, alternative sequences of the steps of the method are conceivable—unless stated otherwise. The steps of the method can be implemented in various ways, so an implementation in software (by program instructions), in hardware or in a combination of the two is conceivable for the implementation of the steps of the method.

Terms used in the claims, such as "comprise", "have," "include," "contain," and the like, do not exclude other elements or steps. The phrase "at least partly" covers both the "partial" and the "complete" case. The phrase "and/or" should be understood as revealing both the alternative and the combination, i.e. "A and/or B" means "(A) or (B) or (A and B)". A plurality of units, persons or the like means multiple units, persons, or the like in the context of this specification. The use of the indeterminate article does not exclude a plurality. A single device can perform the functions of multiple units or devices named in the claims. Reference characters indicated in the claims should not be regarded as restrictions on the means and steps used.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, performed by an apparatus, the method comprising:
    obtaining or causing the obtaining of sensor information captured by at least one environment sensor of an unmanned vehicle, wherein the sensor information represents at least one object parameter of an object that is moving relative to the unmanned vehicle, wherein the unmanned vehicle participates in traffic on land in pedestrian areas and wherein the object is a vehicle or an object in an environment of the unmanned vehicle;
    determining, at least partly based on the at least one object parameter, whether a collision between the unmanned vehicle and the object is imminent; and
    if it is determined that a collision between the unmanned vehicle and the object is imminent:
        determining, at least partly based on the at least one object parameter, at least one triggering parameter for triggering at least one crash cushion of the unmanned vehicle, and
        triggering or causing the triggering of the at least one crash cushion according to the at least one triggering parameter, wherein the at least one crash cushion is triggered before the imminent collision.

2. The method according to claim 1, wherein the determination of whether a collision between the unmanned vehicle and the object is imminent includes:
    determining a probability of the imminent collision occurring, at least partly based on the at least one object parameter.

3. The method according to claim 1, wherein the determination of whether a collision between the unmanned vehicle and the object is imminent is performed at least partly based on a decision model obtained by machine learning.

4. The method according to claim 1, wherein the unmanned vehicle comprises a plurality of crash cushions.

5. The method according to claim 4, the method further including:
    determining, at least partly based on the at least one object parameter, which at least one crash cushion of the plurality of crash cushions is to be triggered.

6. The method according to claim 1, wherein the at least one triggering parameter determines at least one of a triggering intensity, a triggering volume, or a triggering time for triggering the at least one crash cushion.

7. The method according to claim 1, wherein the at least one object parameter of the object represents at least one of:
    a position of the object,
    a distance of the object from the unmanned vehicle,
    an object class of the object,
    a direction of movement of the object,
    a speed of the object, or
    an acceleration of the object.

8. The method according to claim 1, wherein the at least one environment sensor of the unmanned vehicle is one of the following sensors: a temperature sensor, an electromagnetic sensor, an acoustic sensor, or an optical sensor.

9. The method according to claim 1, the method further including:
    obtaining or causing the obtaining of vehicle information, wherein the vehicle information represents at least one vehicle parameter of the unmanned vehicle, and wherein the determination of whether a collision between the unmanned vehicle and the object is imminent is at least partly based on the at least one vehicle parameter and/or the determination of the at least one triggering parameter for the triggering of the at least one crash cushion of the unmanned vehicle is at least partly based on the at least one vehicle parameter.

10. The method according to claim 9, wherein the vehicle information is captured by at least one vehicle sensor of the unmanned vehicle.

11. The method according to claim 9, wherein the at least one vehicle parameter represents at least one of:
    a direction of movement of the unmanned vehicle,
    a speed of the unmanned vehicle, or
    an acceleration of the unmanned vehicle.

12. The method according to claim 1, wherein the unmanned vehicle is an at least semi-autonomous and/or automatically and/or remotely driven vehicle, and/or wherein the unmanned vehicle comprises means for the accommodation and transport of one or more goods items, and/or wherein the unmanned vehicle is not intended for the transport of persons.

13. A non-transitory computer readable storage medium, in which computer program code is stored, wherein the computer program code causes an apparatus to perform, when executed by a processor:
    obtaining or causing the obtaining of sensor information captured by at least one environment sensor of an unmanned vehicle, wherein the sensor information represents at least one object parameter of an object that is moving relative to the unmanned vehicle, wherein the unmanned vehicle participates in traffic on land in pedestrian areas and wherein the object is a vehicle or an object in an environment of the unmanned vehicle;

determining, at least partly based on the at least one object parameter, whether a collision between the unmanned vehicle and the object is imminent; and if it is determined that a collision between the unmanned vehicle and the object is imminent:

determining, at least partly based on the at least one object parameter, at least one triggering parameter for triggering at least one crash cushion of the unmanned vehicle, and triggering or causing the triggering of the at least one crash cushion according to the at least one triggering parameter, wherein the at least one crash cushion is triggered before the imminent collision.

14. An apparatus, comprising at least one processor and at least one memory containing computer program code, the at least one memory and the computer program code with the at least one processor configured to cause the apparatus at least to perform:

obtaining or causing the obtaining of sensor information captured by at least one environment sensor of an unmanned vehicle, wherein the sensor information represents at least one object parameter of an object that is moving relative to the unmanned vehicle, wherein the unmanned vehicle participates in traffic on land in pedestrian areas and wherein the object is a vehicle or an object in an environment of the unmanned vehicle;

determining, at least partly based on the at least one object parameter, whether a collision between the unmanned vehicle and the object is imminent; and if it is determined that a collision between the unmanned vehicle and the object is imminent:

determining, at least partly based on the at least one object parameter, at least one triggering parameter for triggering at least one crash cushion of the unmanned vehicle, and triggering or causing the triggering of the at least one crash cushion according to the at least one triggering parameter, wherein the at least one crash cushion is triggered before the imminent collision.

15. The apparatus according to claim 14, wherein the apparatus:
is the unmanned vehicle;
is part of the unmanned vehicle; or
is a module for the unmanned vehicle.

16. The apparatus according to claim 14, wherein the determination of whether a collision between the unmanned vehicle and the object is imminent includes:
Determining a probability of the imminent collision occurring, at least partly based on the at least one object parameter.

17. The apparatus according to claim 14, wherein the determination of whether a collision between the unmanned vehicle and the object is imminent is performed at least partly based on a decision model obtained by machine learning.

18. The apparatus according to claim 14, wherein the unmanned vehicle comprises a plurality of crash cushions.

19. The apparatus according to claim 14, wherein the at least one triggering parameter determines at least one of a triggering intensity, a triggering volume, or a triggering time for triggering the at least one crash cushion.

20. The apparatus according to claim 14, wherein the at least one object parameter of the object represents at least one of:
a position of the object,
a distance of the object from the unmanned vehicle,
an object class of the object,
a direction of movement of the object,
a speed of the object, or
an acceleration of the object.

21. The apparatus according to claim 14, wherein the at least one memory and the computer program code with the at least one processor are further configured to cause the apparatus at least to perform:
obtaining or causing the obtaining of vehicle information, wherein the vehicle information represents at least one vehicle parameter of the unmanned vehicle, and wherein the determination of whether a collision between the unmanned vehicle and the object is imminent is at least partly based on the at least one vehicle parameter and/or the determination of the at least one triggering parameter for the triggering of the at least one crash cushion of the unmanned vehicle is at least partly based on the at least one vehicle parameter.

* * * * *